Nov. 13, 1956    A. D. F. MONCRIEFF    2,770,171
GEAR CUTTING DEVICE

Filed Jan. 29, 1952      4 Sheets-Sheet 1

INVENTOR.
Alexander D. F. Moncrieff
BY
Harness, Dickey & Pierce
ATTORNEYS.

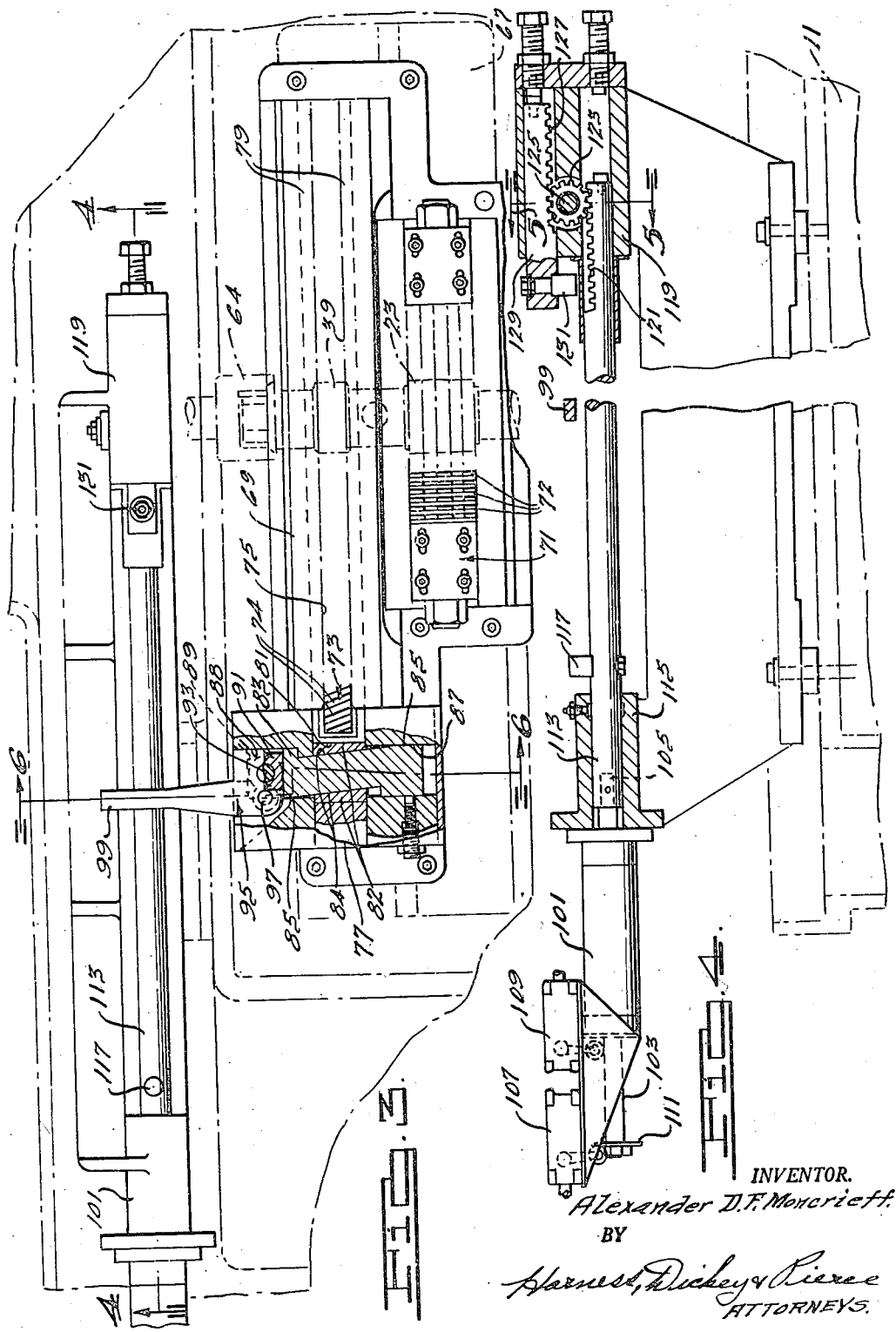

Nov. 13, 1956  A. D. F. MONCRIEFF  2,770,171
GEAR CUTTING DEVICE
Filed Jan. 29, 1952  4 Sheets-Sheet 3
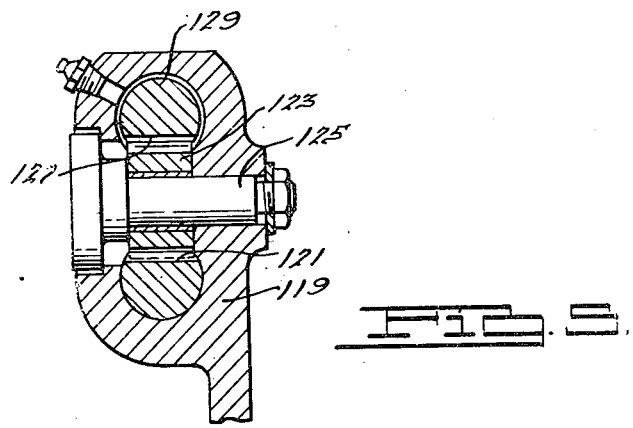
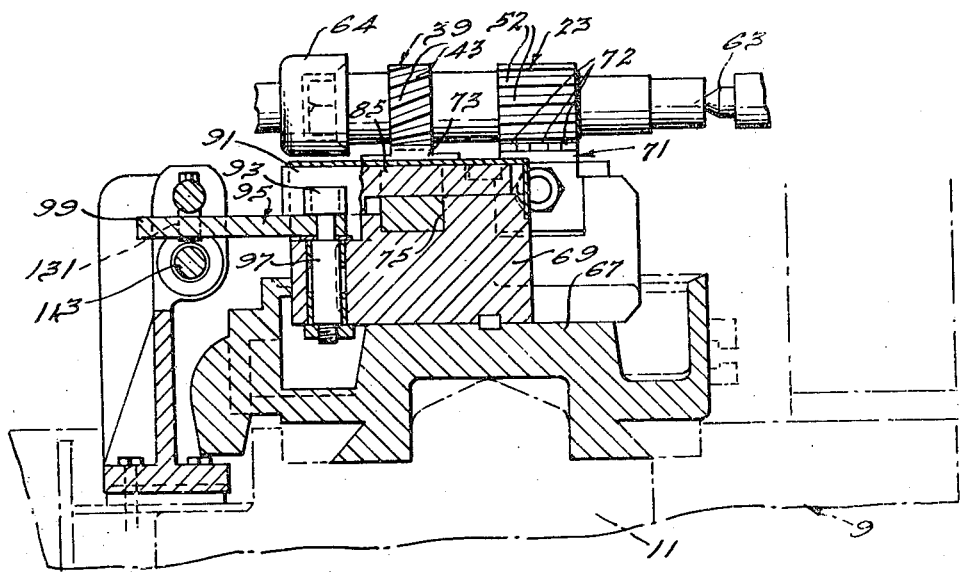
INVENTOR.
Alexander D. F. Moncrieff.
BY
Harness, Dickey & Pierce.
ATTORNEYS.

Nov. 13, 1956     A. D. F. MONCRIEFF     2,770,171
GEAR CUTTING DEVICE
Filed Jan. 29, 1952     4 Sheets-Sheet 4
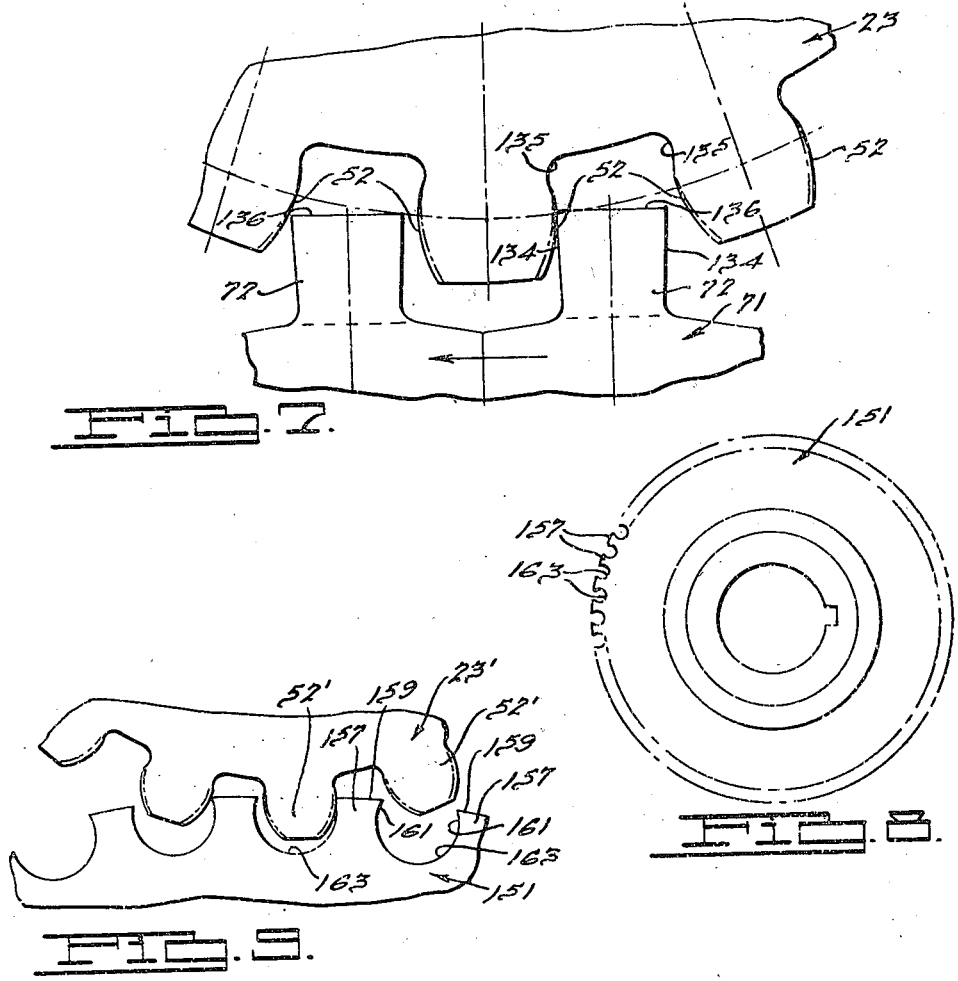
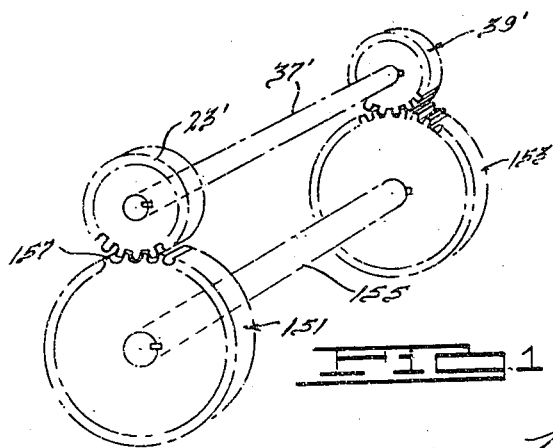
INVENTOR.
Alexander D. F. Moncrieff
BY
Harness, Dickey & Pierce
ATTORNEYS United States Patent Office 2,770,171
Patented Nov. 13, 1956

2,770,171

GEAR CUTTING DEVICE

Alexander D. F. Moncrieff, Detroit, Mich., assignor to Michigan Tool Company, Detroit, Mich., a corporation of Delaware Application January 29, 1952, Serial No. 268,895

6 Claims. (Cl. 90—1.6)

This invention relates generally to gear finishing devices and more particularly to a novel device and tool for finishing or side trimming involute gear teeth.

While it the past many gear finishing devices and tools have been developed for finishing gear teeth, it has not been possible to satisfactorily and efficiently side trim relieved portions on the tooth surfaces of involute gear teeth. In many devices, such as vehicle transmissions, there is a tendency for certain of the gears to jump out of mesh with their complemental gears when a load is applied in various speeds. In order to overcome this tendency, it has been found desirable to reduce the thickness of involute spline teeth on the spline shaft that these gears are located on. It has been extremely difficult and expensive to trim this relief on the tooth surfaces of the spline shaft because of lack of knowledge of the proper type of device for performing this operation, and the proper method of accomplishing the same. Still further, the generation by a cutting tool of a true involute form on the tooth surfaces of gear teeth has always presented a relatively complex and difficult problem. However, with the tools of this invention a true involute may be generated in an improved, inexpensive manner, particularly on gears having a relatively small number of teeth, in a manner not heretofore known.

It is therefore an object of this invention to provide a device for finishing or trimming gear teeth of the aforementioned type in an improved manner.

It is a further object of this invention to provide a device and tool of the aforementioned type which will accurately finish or side trim the tooth surfaces of gear teeth and generate a true involute form thereon, either in the finishing of the entire tooth surface or in providing relieved portions thereon of a true involute form.

It is a still further object of this invention to provide a device of the aforementioned type which is efficient in operation, in which a minimum of wear of the cutting tools will occur, and which will permit the finishing or trimming operation to be performed in a shorter period of time than has been heretofore possible.

It is a still further object of this invention to provide a device for performing the aforementioned operations in a completely automatic manner.

It is a still further object of this invention to provide an improved rotary cutting tool which can be used for the generation of true involute gear teeth and the finishing of the gear teeth to an extremely accurate form.

It is a still further object of this invention to provide a new and novel flat racklike cutting tool for finishing gear teeth and generating a true involute form.

It is a still further object of this invention to provide an improved machine for carrying out the operations of this invention.

These and other objects of this invention will become apparent from the following detailed description, taken in conjunction with the accompanying drawings, in which:

Fig. 3 is a fragmentary view, partially in section and partially in elevation, of the machine work table and adjacent portions of the machine and device of this invention;

Fig. 4 is a sectional view of the structure illustrated in Fig. 3, taken along the line 4—4 thereof;

Fig. 5 is an enlarged sectional view of the structure illustrated in Fig. 4, taken along the line 5—5 thereof;

Fig. 6 is an enlarged sectional view of the structure illustrated in Fig. 3, taken along the line 6—6 thereof;

Fig. 7 is an enlarged elevational view illustrating the gear to be shaved, in engagement with a flat rack-type cutting tool which finishes the tooth surfaces thereof;

Fig. 8 is a side elevational view of a rotary cutting tool adapted to finish a gear;

Fig. 9 is a side elevational view showing a gear to be shaved in engagement with the rotary cutting tool illustrated in Fig. 8; and Fig. 10 is a schematic view illustrating one arrangement for controlling and performing the gear finishing operation of this invention with a rotary cutter tool.

Figures 1, 2:
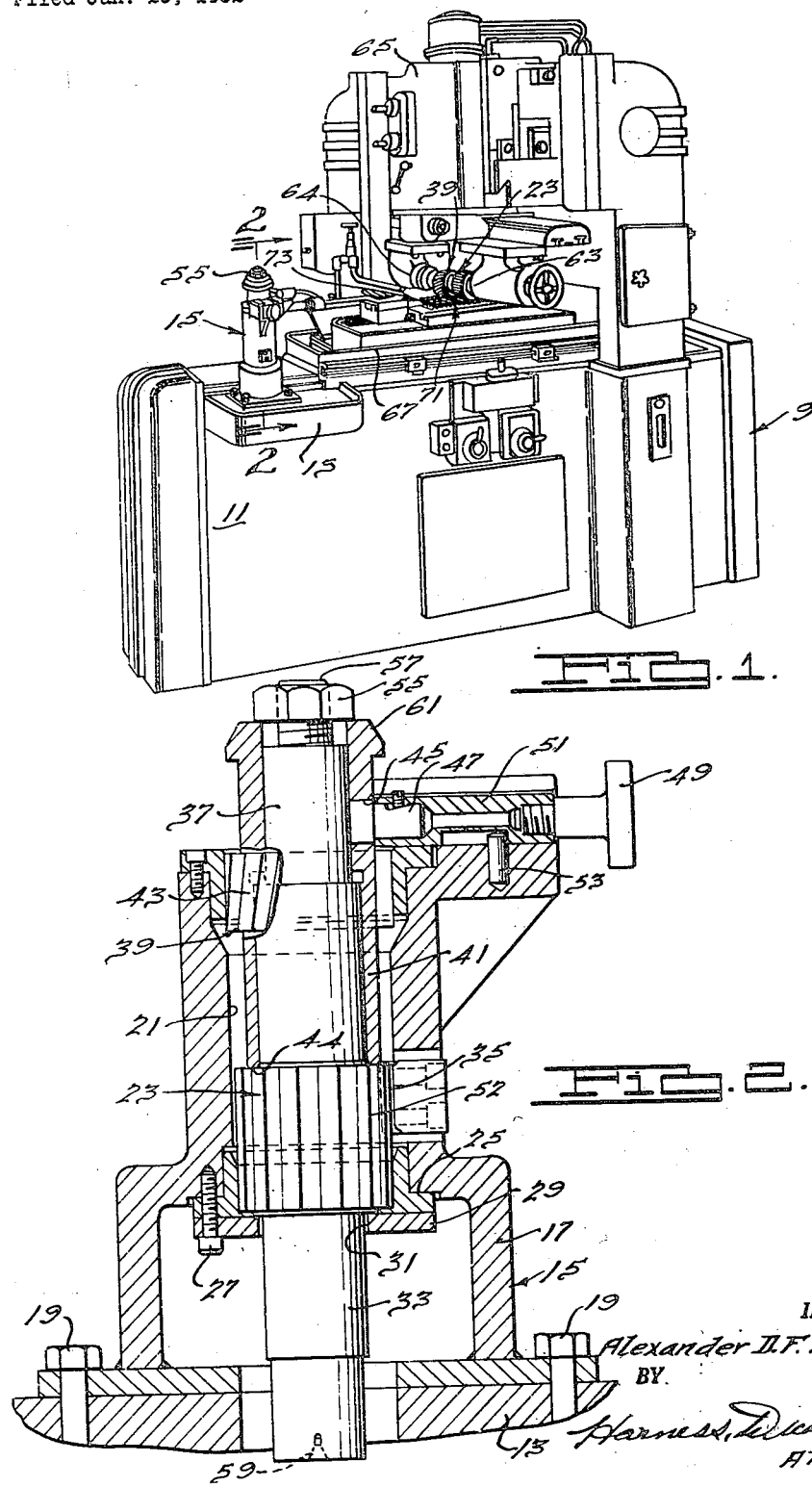
Figure 1 is a perspective view of a machine for performing the gear finishing operations of this invention.
Fig. 2 is an enlarged sectional view of the structure illustrated in Fig. 1, taken along the line 2—2 thereof.

Referring now to the drawings, and more particularly to Figure 1, it will be seen that a gear finishing machine 9 is illustrated for performing the operation of this invention. While a gear finishing machine of one type is illustrated, any suitable type of machine may be employed which incorporates a reciprocating worktable adapted to carry a cutting tool and means for rotatably supporting the gear to be trimmed or finished. The machine 9 includes a base 11, having a ledge or shelf portion 13, on which is mounted a work gear aligning fixture 15. The fixture 15 is illustrated in detail in Fig. 2, and while it is illustrated as being supported on the machine 9, it will be apparent that the fixture need not be mounted on the machine, but could be mounted on a worktable, or the like. However, it is illustrated as being mounted on the machine 9, for the purpose of convenience.

The fixture 15 includes a cylindrical housing 17, which is secured to the machine shelf 13 by suitable means, such as bolts 19. The housing 17 is provided with a central opening or recess 21, into which the gear 23 to be finished or trimmed is inserted. A collarlike abutment element 25 is secured to the housing 17 in the lower end of the opening 21, by suitable means, such as cap screws 27, so as to provide a stop or support for the gear 23. The abutment 25 and its adjacent faceplate 29 are provided with a central aperture 31 through which the shaft portion 33 on one end of the gear 23 may extend. Thus, when the gear 23 is inserted into the fixture, it will rest upon the abutment 25.

A rack 35 is supported in one side of the housing 17 above the abutment 25, and meshes with the gear 23 and retains the same against rotation relative to the housing. A shaft portion 37 of the gear 23 projects upwardly beyond the upper extremity of the housing 17, and a master gear 39 is inserted downwardly over the gear shaft portion 37. The master gear 39 includes a hollow tubular portion 41, having helical gear teeth 43 extending around the periphery thereof intermediate its opposite ends. The lower end of the tubular portion 41 is provided with chisel points 44, which are adapted to project into the adjacent face of the gear 23 to locate the gear 23 relative to the master gear 39, as will be hereinafter brought out. The tubular portion 41 of the master gear is provided with a laterally extending opening 45 above the gear portion 43, which is adapted to receive a plunger 47, movably supported in the upper portion of the fixture housing 17. The plunger 47 has a handle 49 connected with the outer end thereof beyond the confines of the fixture 15. The plunger 47 and handle 49 are connected in any suitable manner with a slide 51, which is supported in the fixture housing 17 for lateral sliding movement. A stop pin 53 is mounted in the fixture housing 17 for limiting the movement of the slide 51.

The plunger 47, the aperture 45 in the master gear 39, and the housing rack 35 are so located relative to each other that when the plunger 47 is in the master gear aperture 45, the helical gear teeth 43 will have their centers on the same line as the centers of the teeth 52 of the gear 23. Thus, the plunger 47 acts as a means for properly aligning the helical teeth 43 of the master gear with the teeth of the gear to be finished, 23, and it can be moved outwardly so as to be out of an obstructing relationship with the gear 23, to permit the gear to be inserted into the fixture. After the master gear has been inserted over the gear 23, and the plunger 47 inserted into the aperture 45, a nut 55 is threaded on the gear threaded stem 57. The nut 55 engages the upper end of the master gear, and by tightening the nut the master gear and the gear 23 can be locked together in their properly aligned relationship, and the chisel points 44 on the lower end of the master gear will aid in the prevention of rotation between the gear 23 and master gear 39. The lower end of the gear shaft portion 33 is provided with a recess 59, into which a center is adapted to be inserted, and the upper end of the master gear 39 is provided with a shoulder 61, which is adapted for engagement with a female center, as will be more fully explained herein. While the master gear is illustrated and described as having helical gear teeth, it should be clearly understood that the master gear could have spur gear teeth, but helical gears are preferred because they have a better rolling action with their complemental gears than do spur gears.

After the master gear has been connected with the gear 23, as previously described, the gear assembly is mounted between a tailstock 63 and a headstock 64, which head and tailstock are mounted in any suitable manner on a head structure 65 of the machine, so that the gear overhangs a reciprocable table 67. The head and tailstock 64 and 63 are vertically adjustable so that the gears can be brought into proper engagement with cutting tools and gears carried by the reciprocable table 67.

As can be best seen in Figs. 3 and 6, a racklike cutting tool 71 is bolted or otherwise suitably secured to the table 67 adjacent the front thereof. The racklike cutting tool 71 is provided with a plurality of cutting teeth 72, adapted to finish or trim the teeth of the gear 23 in a manner which will be brought out hereinafter. A cutting tool base 69 is rigidly connected with the reciprocable table 67 by any suitable means, and a master gear rack 73 is mounted on the base 69 rearwardly of the cutting tool 71, and extends generally parallel to the cutting tool 71. It will be noticed from Fig. 3 that the master rack 73 extends longitudinally beyond the opposite ends of the cutting tool 71 so as to be longer than the cutting tool and the teeth 74 of the master rack are in alignment with the teeth 72 of the cutting tool. The master gear rack 73 is supported in a longitudinally extending groove 75 in the base 69, and is provided on its left-hand end, as viewed in Fig. 3, with an extension or slide member 77, which is rigidly connected therewith in any suitable manner. Holddown strips 79 are provided for properly retaining the master gear rack in its slot or groove 75. The master gear rack extension 77 has a slot 81 extending laterally thereacross, in which spaced apart wear strips 82 are supported. The opposed side faces of the wear strips 82 are parallel to each other and extend at an angle of more or less than 90° relative to the master gear rack so as to be inclined. A slide member 83 extends laterally through slot 81 and has its opposite ends projecting beyond the opposite sides of the master gear rack 73. The slide member 83 is formed with opposed side face portions 84 which are angled or inclined in the same manner as the side faces of the slot wear strips 82, and with side face portions 85, at opposite ends thereof which slidably engage the walls of slots 87 and 88 in base 69. The walls of slots 87 and 88 extend at right angles to the direction of movement of the master gear rack 73 so as to guide the lateral movement of the slide member in a direction at right angles to the direction of movement of the master gear rack. Therefore, when the slide 83 is moved laterally relative to the base 69 and master gear rack 73, the engagement of the slide inclined face portions 84 with the inclined side faces of wear strips 82 will cause longitudinal movement of the master gear rack. The slide 83 is provided adjacent its rear portion with a slot 89 in which is mounted a block 91. The block 91 is slidable in a direction parallel to the direction of movement of the master gear rack 73 and a pin 93 projects downwardly from the block and is rotatably journaled in the inner end of a lever 95. The lever 95 is pivotally connected with the base 69 at 97, and has a portion 99 projecting rearwardly of the base. When the portion 99 of the lever is actuated or moved, the lever will pivot about its pivot pin 97, which movement will cause lateral movement of the slide member 83, through the block 91, and in turn cause longitudinal movement, in one direction or the other, of the master gear rack 73, as previously described.

As can be best seen in Fig. 4, a piston and cylinder unit is supported on the machine base rearwardly of the reciprocable table 67, and a piston rod 103 projects from one end of the unit 101 and a piston rod 105 from the opposite end of the piston. Limit switches 107 and 109 are supported adjacent to the piston rod 103 and are adapted to be engaged by an abutment member 111 on the end of the piston rod 103 to limit the movement of the piston rods in either direction of their movement and to cause the piston rods to return to their normal positions when they reach the end of a predetermined stroke, as will be hereinafter brought out. The piston and cylinder unit 101 is connected with the hydraulic circuit of the machine 9 in any suitable or conventional manner, so that the piston rods 103 and 105 are moved inwardly in one direction at one end of each reciprocating stroke of the worktable. The worktable, of course, is reciprocated by any suitable means, such as illustrated in United States Patent No. 2,254,240, issued September 2, 1941, to E. A. Overstedt and assigned to the assignee of this application, and it is not thought necessary to describe in detail the mechanism for reciprocating the table or operating the piston and cylinder unit 101.

The piston rod 105 is connected with one end of a rod or shaft 113, which is slidably supported by a member 115 mounted on the machine base. Projecting upwardly from the rod 113 adjacent the left-hand end thereof, as viewed in Fig. 4, is an abutment pin 117. The opposite end of the rod 113 is movably supported by member 119 and has a rack gear 121 provided thereon. The rack gear 121 meshes with a spur gear 123, which is rotatably supported by a pin 125, connected with member 119, and the gear 123 in turn meshes with a rack 127 on a rod 129, which is slidably supported in member 119 above rod 113. Rod 129 carries a downwardly projecting abutment pin 131, and the abutment pins 117 and 131 are disposed in a position such as to engage the outer end 99 of the lever 95 when the reciprocable table reaches either end of its stroke. Thus at the end of each reciprocation of the worktable the lever 95 will be actuated and the positions of the abutments will change to control the gear cutting operation, as will hereinafter appear.

The cutting tool 71 is mounted on the table 67, so that the teeth 72 thereof are in alignment with the centers of the helical teeth of the master gear rack 73. The teeth 72, as well as the teeth 52 of the gear 23, are shown in detail in Fig. 7, wherein it will be seen that the work gear teeth have been hobbed out to form and the flanks thereof are recessed or cut back, adjacent the roots thereof, at 135. The gear teeth 52 are of an involute shape and the tooth surfaces thereof are finished, or if desired trimmed at spaced intervals therealong by means of the rack-type cutting tool 71. If it is desired to trim the tooth surfaces at three spaced intervals such as illustrated in Fig. 1, the flanks 134 of the cutting tool are likewise cut back or relieved at three places, as can be clearly seen. If however, the tooth surfaces of the gear teeth are to be finished, as distinguished from trimmed at spaced intervals, such relieved portions on the cutting tool teeth flanks are not provided. In any case the cutting tool will generate a true involute form and thus will so finish the gear teeth. The flanks of each of the cutting tool teeth 72 are relieved so as to be wider adjacent the crests of the teeth than adjacent the roots thereof. The crests 136 of the cutting teeth are substantially flat so that the junction of the tooth surface and crest of each tooth provides a cutting edge for engaging and finishing the gear teeth. The width of the crest of each cutting tooth is less than the tooth space between the gear teeth 52, so that only one cutting edge of each cutting tool tooth will engage one tooth surface of a gear tooth 52 to trim or finish the same while the other cutting edge will be out of engagement with the adjacent gear tooth surface. In this way the opposite cutting edge of the cutting tool tooth will not ride along or engage the adjacent gear tooth so as to dull the cutting edge or adversely affect the shape or form thereof.

The master gear 39 and the master gear rack 73, which are in rolling engagement with each other, maintain the cutting tool and the work gear teeth in cutting relationship with respect to each other so that during reciprocation of the worktable the gear finishing operation will be properly carried out. The crests 136 of the cutting tool teeth 72 are disposed at the same height as the pitch line of the teeth 74 of the master gear rack 73, and the diameter of the pitch line of the master gear teeth 43 is equal to the diameter of the base circle of the teeth 52. Therefore, as the master gear rack 73 and the cutting tool 71 are both mounted on the reciprocable table 67, and due to the fact that the master gear 39 and the work gear 23 are supported on a common shaft, the cutting tool and work gear are maintained in a predetermined cutting relationship relative to each other because of the rolling engagement of the master gear with the master gear rack. Furthermore, due to the fact that the diameter of the pitch line of the master gear is equal to the diameter of the base circle of the work gear, the rack-type cutting tool 71 will cut only to the base circle of the work gear 23 and will generate a true involute on the work gear teeth tooth surfaces, so as to trim or finish the tooth surfaces of the gear teeth 52 in the manner heretofore described. As the base 69 and the master gear rack 73 and cutting tool 71 are reciprocated relative to the master gear 39 and work gear 23, the flat-type cutting tool will finish or trim the tooth surfaces of the work gear teeth 52 a predetermined amount during each reciprocation, and in view of the fact that at the end of each reciprocating stroke the slide 81 is moved, to vary the relative position between the master gear rack and master gear, the work gear teeth will be finished or trimmed more during each reciprocation until the desired finished form is obtained, in the manner which will be hereinafter described.

In operation, after the master gear 39 and work gear 23 have been assembled in the fixture, they are mounted between the headstock and tailstock 64 and 63, and the master gear is positioned so as to be in proper rolling engagement with the master gear rack 73. The machine is then started so as to cause reciprocation of the worktable 67 and base 69, and thus of the master gear rack 73 and the rack-type cutting tool 71. The cutting tool will thus move lineally, for example, to the right into engagement with the work gear 23, and the rolling engagement of the master gear 39 and master gear rack 73 will maintain the work gear 23 in proper engagement with the cutting tool 71 so that during reciprocation in one direction the teeth of the cutting tool 71 will finish or trim the work gear teeth 52 on one face thereof. When the reciprocable table reaches one end of its stroke the lever 99 will engage the pin 131 so as to shift the master gear rack 73 and thus change the relationship between the latter and the master gear 39 and also between cutting tool 71 and the work gear 23. When the table reciprocates in the opposite direction, the opposite faces or tooth surfaces of the work gear teeth will be finished or trimmed by the cutting tool teeth and when the table reaches the end of this stroke, the lever 99 engages the pin 117 so as to cause a shifting of the master gear rack in the opposite direction. At the end of each reciprocation, the piston 101 is actuated to move the rod 113, which movement will, of course, bring the pins 117 and 131 closer together. Thus, the master gear rack will be constantly indexed to vary the relationship between the work gear and the cutting tool, so that after a predetermined number of reciprocations of the cutting tool the tooth surfaces of the work gear teeth will be finished or trimmed to their final desired form.

It will thus be seen that the tooth surfaces of the gear teeth of a rotary gear can be finished or trimmed at spaced intervals to a true involute form by a flat rack type cutting tool in a relatively inexpensive, simple and economical manner not heretofore possible.

In the embodiment of the invention illustrated in Figs. 8 through 10, the tooth surfaces of the work gear teeth 52' are finished by means of a rotary cutting tool 151. During this operation the master gear 39' is supported on one end of the shaft portion 37' while the work gear 23' is supported on the other end thereof in a predetermined relation to the master gear, as previously described. A rotary gear 153, instead of a master gear rack, as previously described, meshes with the master gear 39' and the gear 153 is supported on one end of a shaft 155 while the rotary cutting tool 151 is supported on the opposite end thereof with its teeth 157 in alignment with the teeth of the gear 153, in substantially the same manner as described. The teeth 157 of the rotary cutting tool 151 are spaced in substantially the same manner as the teeth of the cutting tool 71, so that the pitch line of the teeth 157 is substantially equal to the top or crest of the teeth of the flat cutting tool 71. The teeth 157 of the cutting tool 151 have substantially flat crests 159 and have their flanks 161, adjacent to the crests, relieved or cut back so that the widest point of each tooth is across the crest. The relieved portions 161 of the adjacent teeth blend into a radiused flank and root portion 163, and the root and flank portions 163 are disposed on a large enough radius so as not to contact any portion of the work gear teeth 52' during the finishing operation. Therefore, the only point of contact between the cutting tool teeth 157 and the work gear teeth 52' is the cutting edge formed between the crest 159 of each tooth and the flank portion 161 on each side of the crest. Thus, when the rotary cutting tool 151 is rotated, the cutting edge on one side of each tooth 157 will cut or finish one tooth surface of each work gear tooth 52' and when the cutting tool 151 is rotated in the opposite direction the opposite tooth surface of each work gear tooth will be similarly cut or finished. Means, of course, must be provided for indexing the gear 153, which meshes with the master gear 39', relative to the master gear so that upon continued reversed rotation of the cutting tool 151 more and more metal will be removed from the tooth surfaces of the gear teeth 52' thus finishing the latter to the desired size and generating a true involute.

It will, therefore, be appreciated that gear teeth may be finished to a true and accurate involute form with either a flat cutting tool or a rotary cutting tool, and that in either case a single point or line contact between the cutting tool teeth and the work gear teeth will be maintained for finishing or trimming gear teeth to the desired form and size. It will likewise be appreciated that this

What is claimed is:

1. A device for finishing involute gear teeth, including a cutting tool having a plurality of cutting teeth adapted to engage and finish the tooth surfaces of the teeth of a work gear, a master gear, means rigidly interconnecting the master gear with the work gear in a predetermined relationship relative thereto and preventing relative movement between the master gear and the work gear, means rotatably supporting said gears, a gear element meshing with said master gear, means rigidly interconnecting said gear element and said cutting tool in an adjustable a predetermined relationship relative to each other and preventing relative movement between said gear element and said cutting tool when said cutting tool and said gear element are in an adjusted predetermined relationship, means for simultaneously actuating and moving said gear element and cutting tool as a single unit relative to said master gear and work gear respectively so that the meshing gear element and master gear will retain said cutting tool teeth and work gear teeth in a cutting relationship relative to each other, whereby said cutting tool teeth will finish the tooth surfaces of said work gear teeth upon said movement.

2. A device for finishing involute gear teeth, including a cutting tool having a plurality of cutting teeth adapted to engage and finish the tooth surfaces of the teeth of a work gear, a master gear, means rigidly interconnecting the master gear with the work gear in a predetermined relationship relative thereto and preventing relative movement between the master gear and the work gear, means rotatably supporting said gears, a gear element meshing with said master gear, means rigidly interconnecting said gear element and said cutting tool in an adjustable predetermined relationship relative to each other and preventing relative movement between said gear element and said cutting tool when said cutting tool and said gear element are in an adjusted predetermined relationship, means for simultaneously actuating and moving said gear element and cutting tool as a single unit relative to said master gear and work gear respectively so that the meshing gear element and master gear will retain said cutting tool teeth and work gear teeth in a cutting relationship relative to each other, whereby said cutting tool teeth will finish the tooth surfaces of said work gear teeth upon said movement, and means for moving said gear element relative to said master gear and said cutting tool at predetermined intervals to effect an indexing movement between said work gear and cutting tool.

3. A device for finishing or trimming the tooth surfaces of involute gear teeth, including a flat cutting tool having a plurality of cutting teeth adapted to finish or trim the tooth surfaces of the work gear and spaced apart a distance equal to the distance between the teeth of the work gear at the base circle thereof, each of said tool teeth including a substantially flat crest the width of which is less than the space between the gear teeth, said tool teeth including flanks relieved adjacent the crest thereof and providing cutting edges at the junction of the crest and flanks, a master gear, means for connecting said master gear with the work gear, means rotatably supporting said master gear and the work gear so that rotation of the master gear causes rotation of the work gear, a master gear rack meshing with said master gear, means supporting said master gear rack and said cutting tool in a predetermined relationship relative to each other, means for reciprocating said supporting means and thus said master gear rack and cutting tool relative to said master gear and work gear so that said master gear and rack will maintain said cutting tool and the work gear in a predetermined cutting relationship relative to each other, whereby upon said reciprocation said cutting tool will finish the tooth surfaces of said work gear teeth.

4. A device for finishing or trimming the tooth surfaces of involute gear teeth, including a flat cutting tool having a plurality of cutting teeth adapted to finish or trim the tooth surfaces of the work gear and spaced apart a distance equal to the distance between the teeth of the work gear at the base circle thereof, each of said tool teeth including a substantially flat crest the width of which is less than the space between the gear teeth, said tool teeth including flanks relieved adjacent the crest thereof and providing cutting edges at the junction of the crest and flanks, a master gear, means for connecting said master gear with the work gear, means rotatably supporting said master gear and the work gear so that rotation of the master gear causes rotation of the work gear, a master gear rack meshing with said master gear, means supporting said master gear rack and said cutting tool in a predetermined relationship relative to each other, means for reciprocating said supporting means and thus said master gear rack and cutting tool relative to said master gear and work gear so that said master gear and rack will maintain said cutting tool and the work gear in a predetermined cutting relationship relative to each other, whereby upon said reciprocation said cutting tool will finish the tooth surfaces of said work gear teeth, and means for moving said master gear rack relative to said cutting tool and said master gear at the end of each reciprocating stroke so as to index the work gear relative to the cutting tool at the end of each reciprocation.

5. In a device for finishing gear teeth, a master gear connectable to a work gear to be finished in a predetermined relationship relative thereto, means for rotatably supporting the work gear and master gear so that rotation of the master gear imparts rotation to the work gear, a reciprocable member disposed adjacent the master gear, means for rotatably supporting the master gear and work gear, means for reciprocating said member at right angles to the axis of the master gear and work gear, a flat rack-type cutting tool supported on said member and engageable with the teeth of the work gear for finishing the same, a gear rack supported on said member in a predetermined relationship relative to the cutting tool and meshing with the master gear so that reciprocation thereof causes rotation of the master gear, means for moving said master gear rack a predetermined distance relative to said member and said cutting tool at the end of each reciprocation, including abutment means supported adjacent said member and an actuating member connected with said master gear rack, said actuating member engaging one of said abutment means when said reciprocating member approaches the end of its reciprocating stroke in either direction to impart said predetermined movement to said master gear rack and thereby index the work gear relative to the cutting tool so that during each reciprocation the cutting tool will remove material from the teeth of said work gear.

6. A device for finishing involute gear teeth including a cutting tool having a plurality of cutting teeth adapted to engage and finish the tooth surfaces of the teeth of a work gear, a master gear having a plurality of teeth, means rigidly interconnecting the master gear with the work gear in a predetermined relationship relative thereto and preventing relative movement between the master gear and the work gear, means rotatably supporting said gears, a gear element having a plurality of teeth meshing with said master gear teeth, means rigidly interconnecting said gear element and said cutting tool in an adjusted predetermined relationship relative to each other and preventing relative movement between said gear element and said cutting tool when said cutting tool and said gear element are in an adjusted predetermined relationship, means for simultaneously actuating and moving said gear element and said cutting tool as a single unit relative to said master gear and work gear respectively so that the meshing gear element and master gear will retain said cutting tool teeth and work gear teeth in a cutting relationship relative to each other, said cutting tool teeth having crests disposed at the same height as the pitch line of said gear element teeth, the diameter of the pitch line of said master gear teeth being equal to the diameter of the base circle of the work gear teeth so that the cutting tool teeth will cut only to the base circle of the work gear teeth and will generate a true involute on the work gear teeth tooth surfaces so as to finish the tooth surfaces upon said movement.

References Cited in the file of this patent

UNITED STATES PATENTS

| | | |
|---|---|---|
| 980,232 | Fawcus | Jan. 3, 1911 |
| 1,269,493 | Newlander | June 11, 1918 |
| 1,438,530 | Jones | Dec. 12, 1922 |
| 2,179,230 | Hamilton | Nov. 7, 1939 |
| 2,267,692 | Dalzen | Dec. 23, 1941 |
| 2,473,233 | Whitfield | June 14, 1949 |
| 2,502,922 | Bura | Apr. 4, 1950 |
| 2,642,780 | Pace | June 23, 1953 |